(12) United States Patent
Havlovitz et al.

(10) Patent No.: US 7,837,073 B2
(45) Date of Patent: Nov. 23, 2010

(54) COLLAPSIBLE SPREADER

(75) Inventors: Paul Havlovitz, Dublin, OH (US); Steve Courtney, Powell, OH (US); Michael Cavins, Marysville, OH (US); Randy Goodwin, Grove City, OH (US); Dan Larimore, Marysville, OH (US)

(73) Assignee: OMS Investments, Inc., Los Angeles, CA (US)

( * ) Notice: Subject to any disclaimer, the term of this patent is extended or adjusted under 35 U.S.C. 154(b) by 829 days.

(21) Appl. No.: 11/036,689

(22) Filed: Jan. 14, 2005

(65) Prior Publication Data

US 2006/0157518 A1 Jul. 20, 2006

(51) Int. Cl.
*A01C 15/16* (2006.01)
(52) U.S. Cl. ............................ 222/625; 239/681
(58) Field of Classification Search ........... 222/609, 222/617, 625, 413, 561, 624, 408, 614, 290, 222/291, 402.12, 144.5, 179.5, 179; 239/681, 239/687, 685, 665, 676–678, 666
See application file for complete search history.

(56) References Cited

U.S. PATENT DOCUMENTS

| | | | | |
|---|---|---|---|---|
| 2,586,492 | A | | 2/1952 | Ulrich |
| 2,817,460 | A | * | 12/1957 | Bond .......................... 222/623 |
| 3,383,055 | A | * | 5/1968 | Speicher ...................... 239/687 |
| 3,738,546 | A | * | 6/1973 | Speicher ...................... 222/561 |
| 4,121,733 | A | * | 10/1978 | McRoskey et al. ............. 222/45 |
| 4,180,184 | A | * | 12/1979 | Florer et al. ................. 222/41 |
| 4,487,370 | A | * | 12/1984 | Speicher ...................... 239/687 |
| 4,588,133 | A | * | 5/1986 | Brabb et al. ................. 239/681 |
| 4,635,818 | A | * | 1/1987 | Glass .......................... 222/41 |
| 4,671,434 | A | * | 6/1987 | Johnston et al. ............. 222/625 |
| 4,867,381 | A | * | 9/1989 | Speicher ...................... 239/665 |
| 4,962,781 | A | * | 10/1990 | Kanbar ........................ 135/65 |

(Continued)

FOREIGN PATENT DOCUMENTS

WO 2006/078324 A2 7/2006
WO 2006/078324 A3 7/2006

OTHER PUBLICATIONS

International Preliminary Report on Patentability from PCT/US2005/029520, prepared Nov. 6, 2007.

*Primary Examiner*—Lien T Ngo
(74) *Attorney, Agent, or Firm*—Hunton & Williams LLP

(57) ABSTRACT

An improved collapsible spreader with a spread rate selection mechanism including a knob and a rotatable cup-shaped structure. The cup-shaped structure includes an elongated setting tab and a thirty-six step edge corresponding to thirty-six spread rate settings on the knob. Operatively engaged with the cup-shaped structure is an abutment tab that is part of a closure structure for blocking and selectively unblocking a hopper opening. The tab engages the setting tab to define the adjustable length of the closure structure. Thereafter, abutment rate selection is a function of the rotatable position of the cup-shaped structure. Engagement of the abutment tab and a step defines the size of the hopper opening and thus the amount of product released from the hopper during operation. The spreader also includes a dual spring arrangement to bias the closure structure to a closed position and to prevent breakage. The disclosed spreader also features a one piece wheel to reduce parts and assembly costs.

25 Claims, 8 Drawing Sheets

U.S. PATENT DOCUMENTS

| | | |
|---|---|---|
| 5,123,598 A | 6/1992 | Courtney et al. |
| 5,288,017 A * | 2/1994 | Halovitz .................... 239/687 |
| 5,489,023 A | 2/1996 | Havlovitz |
| D373,367 S | 9/1996 | Havlovitz |
| 5,570,814 A | 11/1996 | Havlovitz |
| 5,597,092 A | 1/1997 | Havlovitz |
| 5,607,079 A | 3/1997 | DeLaby et al. |
| 5,842,648 A | 12/1998 | Havlovitz |
| 6,616,074 B2 | 9/2003 | Courtney et al. |
| 6,817,552 B2 | 11/2004 | Kinkead et al. |

* cited by examiner

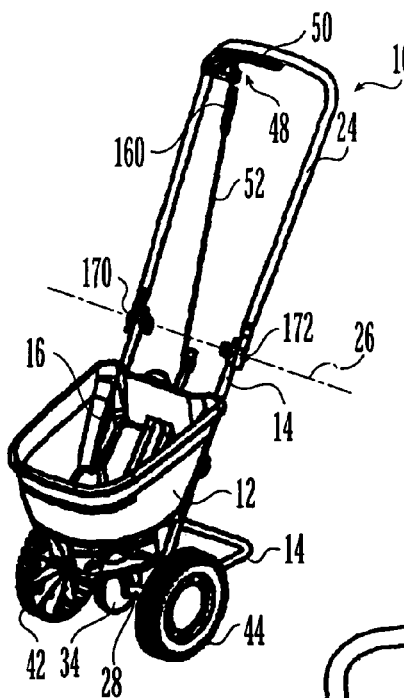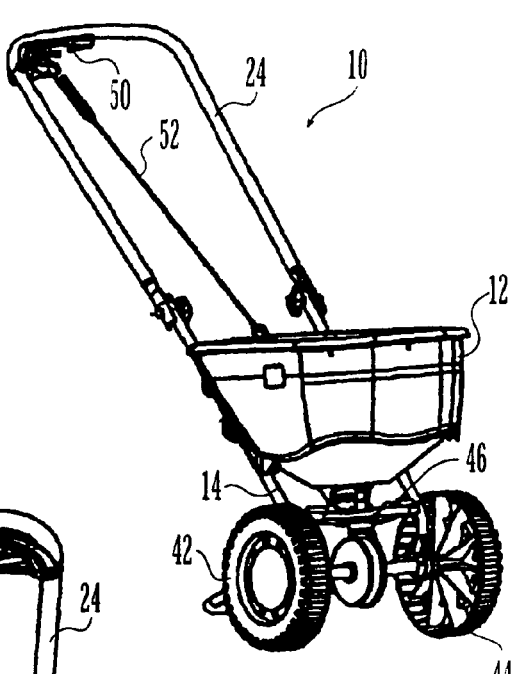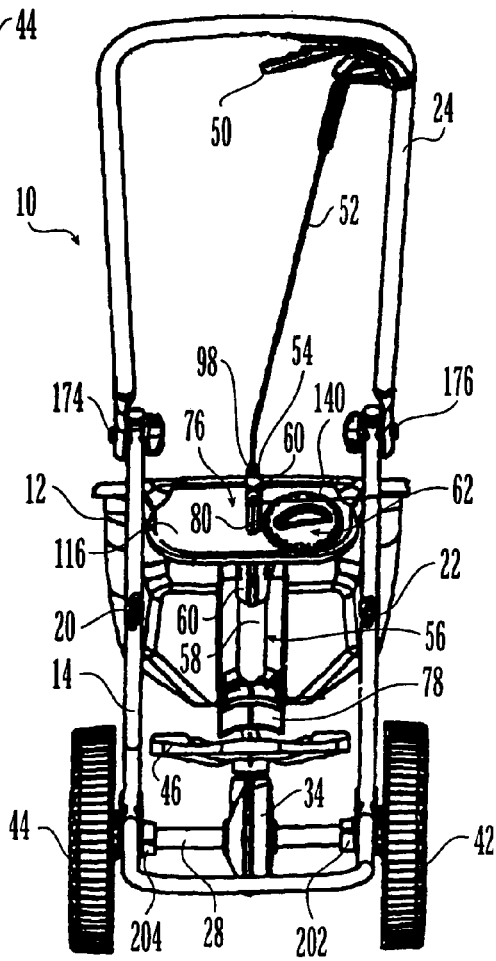
Fig. 1
Fig. 2
Fig. 3

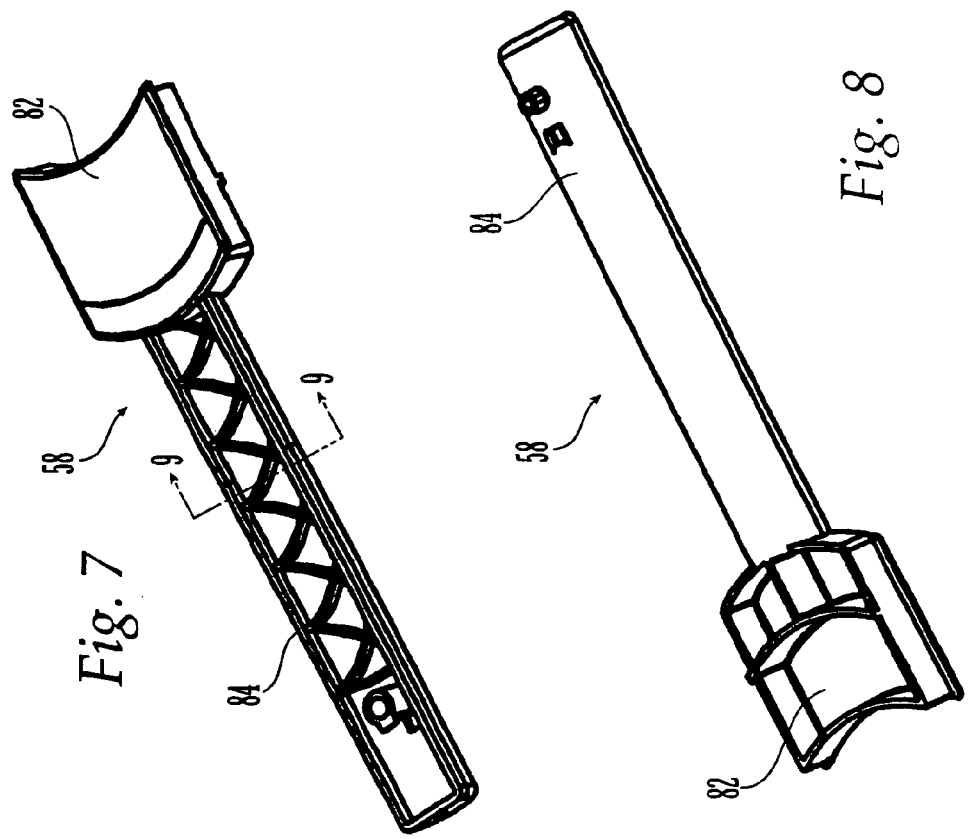
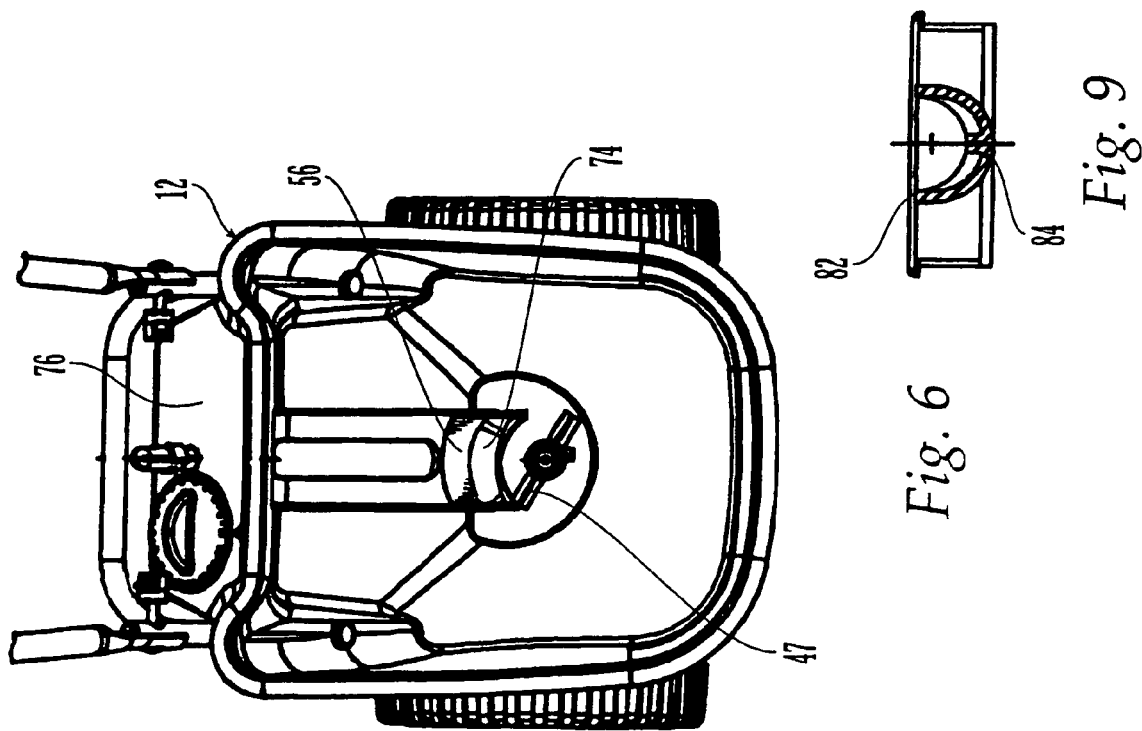

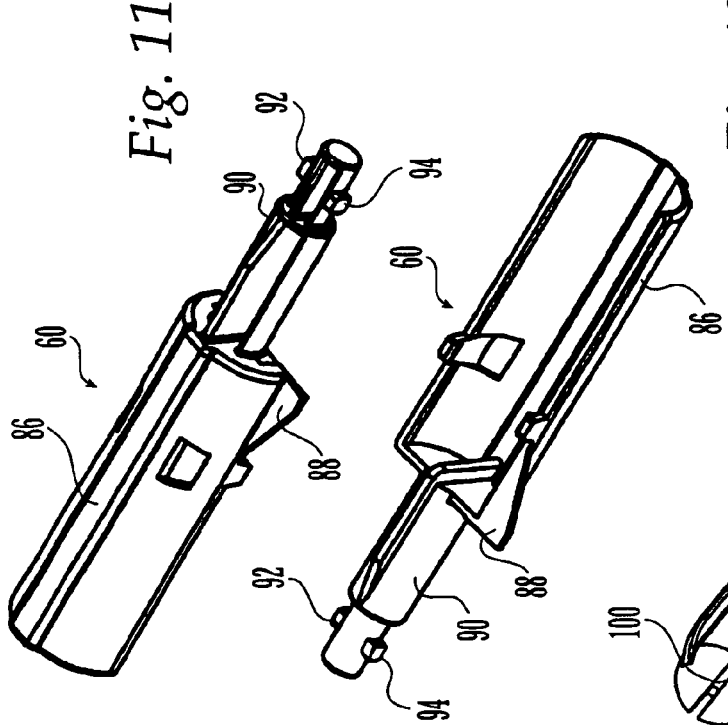
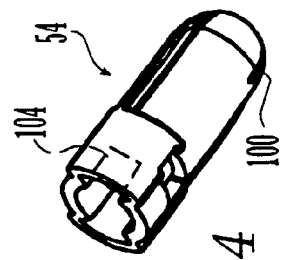
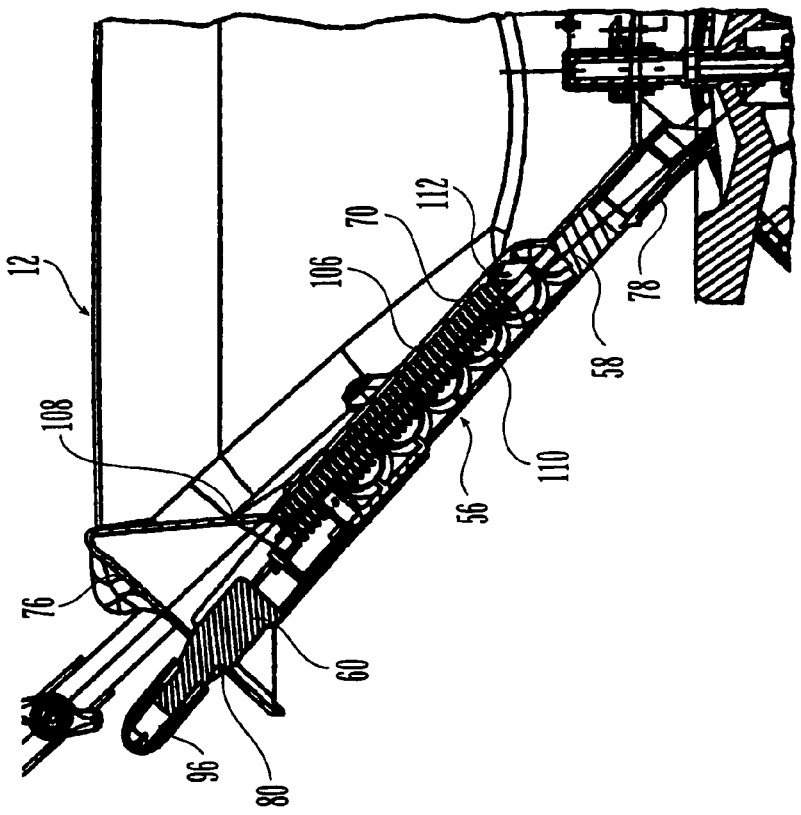

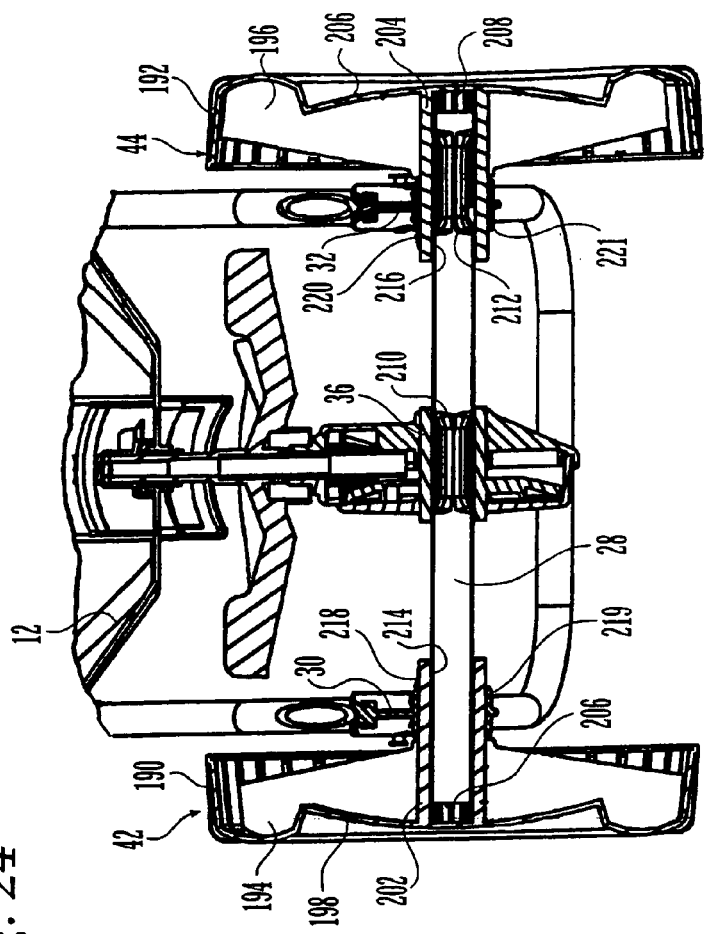
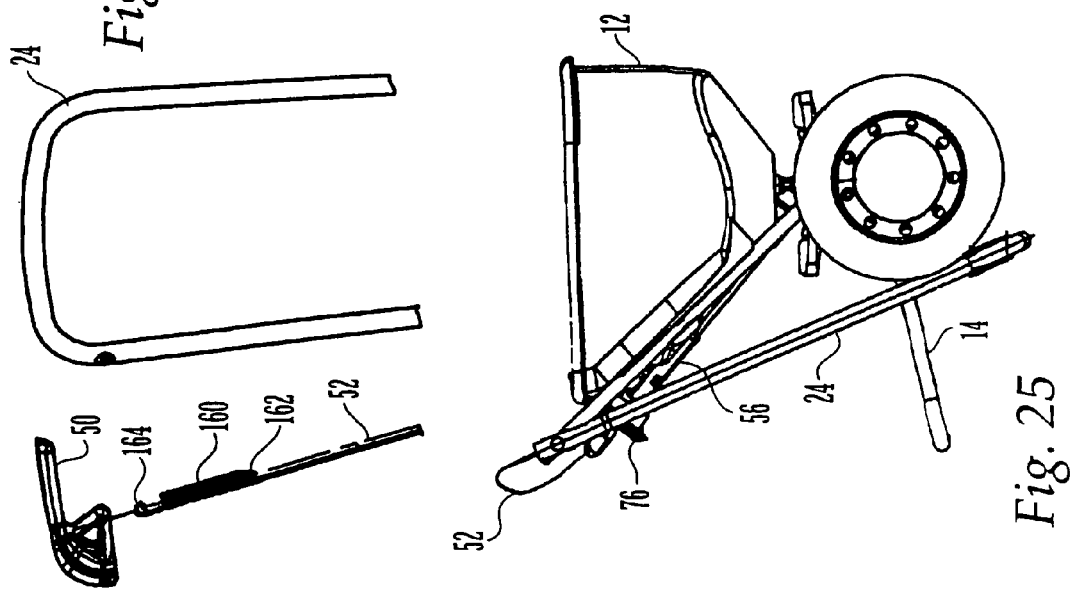
Fig. 24
Fig. 25
Fig. 26

COLLAPSIBLE SPREADER

CROSS REFERENCE TO RELATED APPLICATIONS

Not applicable.

STATEMENT REGARDING FEDERALLY SPONSORED RESEARCH

Not applicable.

BACKGROUND OF THE INVENTION

1. Field of the Invention

The present invention relates to a lawn and garden type spreader and more particularly to a collapsible spreader that is easily adjusted during assembly at the factory so that future calibration and adjustment are eliminated.

2. Description of the Related Art

Lawn and garden spreaders are well known, as exemplified by U.S. Pat. Nos. 6,616,074; 5,607,079; 5,597,092; 5,570,814; D373,367; and 5,123,598. Each of the collapsible spreaders in the above mentioned patents includes a micrometer for calibration and rate setting purposes so that the spread rate of a product carried by the spreader can be consistently controlled. There is a need for such rate setting because there are a wide variety of products available for spreading on lawns, turf, gardens and the like. The spread rate is typically determined by the producer of the product to be spread and number indications are typically placed on the packaging for the product for each of the popular spreaders. A consumer/operator of a particular spreader responds to a package number by setting the size of the opening at the bottom of the spreader hopper. Setting the size of the opening is typically accomplished with the micrometer. The spreader micrometer has a set of numbers matching those on product packaging, and the micrometer controls the extent of the hopper opening by the number setting on the micrometer.

However, it has been found that collapsible spreaders lose their calibration when the handle of the spreader is folded into a stored or shipping position. Accordingly, when the spreader is removed from storage or from a shipping container and is unfolded into an operative position, calibration of the micrometer must be performed to assure consistent rate settings. The need for re-calibration is caused by tolerance buildup in the handle pivot joint. Upon unfolding the handle, the distance between the top of the handle and the shut-off plate blocking the hopper opening varies enough to upset a consistent application of the rate setting numbers. Currently, collapsible spreaders have typically been calibrated at the factory before shipment and must again be calibrated by the consumer/operator each time the spreader is used if the handle has been collapsed. The calibration at the factory and by the consumer is time consuming, troublesome, expensive and prone to error.

BRIEF SUMMARY OF THE INVENTION

The difficulties encountered with previous devices as mentioned above and others have been overcome by the present invention. What is described here is a collapsible spreader including a hopper having an opening through which spreadable product carried by the hopper is dispensed, an actuator structure, and a closure structure connected to the actuator structure, the closure structure being mounted on the hopper and being adjustable to enable the closure structure to selectively block and unblock the hopper opening.

In another embodiment, the collapsible spreader includes the hopper, an adjustable and movable closure structure mounted on the hopper, the closure structure having an elongated arm portion and a closure portion, the actuator structure connected to the arm portion of the closure structure for selectively moving the closure portion of the closure structure, and a selector structure mounted on the hopped and configured to operatively engage with the arm portion of the closure structure to establish the extent of movement of the closure portion of the closure structure.

In another embodiment, a first biasing structure is included for biasing the closure structure into position to block the hopper opening. In yet another embodiment, the actuator structure includes a lever and a wire and a second biasing structure is provided to operatively connect between the lever and the wire.

Still another embodiment includes a pair of wheels for supporting the hopper where each of the pair of wheels includes an outer thread portion, a centrally located segmented hub portion which may be formed integral with the outer thread portion, or formed separately and connected together, and a plurality of radially extending spokes formed integral with the hub portion, the spokes extending between the hub portion and the outer thread portion, the segmented hub portion having an interior surface for receiving a serrated axle and the serrated axle for scoring the interior surface to mount the wheels to the axle. The wheels are also shipped fitted to brackets which are attached to a frame to which the hopper is mounted.

There are a number of advantages, features and objects achieved with the present invention which are believed not to be available in earlier related devices. For example, one advantage of the present invention is that the spreader has a simplified construction which is easier to manufacture and to assemble. Another advantage of the invention is that the disclosed spreader is less expensive. A further feature of the invention is that the disclosed spreader eliminates the need for repeated calibration. That is, once a spreader of the present invention is adjusted at the factory, there is no need to make any further adjustments, particularly by the user of the device. The spreaders of the present invention also feature enhanced reliability as well as simplified structure.

A complete understanding of the present invention and other objects, advantages and features thereof will be gained from a consideration of the present specification which provides a written description of the invention, and of the manner and process of making and using the invention, set forth in such full, clear, concise, and exact terms as to enable any person skilled in the art to which it pertains, or with which it is most nearly connected, to make and use the same in compliance with Title 35 U.S.C. section 112 (first paragraph). Furthermore, the following description of a preferred embodiment of the invention read in conjunction with the accompanying drawing provided herein represent an example of the invention in compliance with Title 35 U.S.C. section 112 (first paragraph), but the invention itself is defined in the Claims section attached hereto.

BRIEF DESCRIPTION OF THE SEVERAL VIEWS OF THE DRAWING

FIG. 1 is a front downward looking isometric view of a collapsible rotary or broadcast spreader.

FIG. 2 is a right front isometric view of the spreader illustrated in FIG. 1.

FIG. 3 is a rear elevation view of the spreader illustrated in FIGS. 1 and 2.

FIG. 6 is a top plan view like that of FIG. 5 but with a closure structure in a partially retracted position such that the hopper opening is partially unblocked.

FIG. 7 is a top isometric view of a lower portion of a closure structure.

FIG. 8 is a bottom isometric view of the lower portion of the closure structure.

FIG. 9 is a sectional view taken along line 9-9 of FIG. 7.

FIG. 10 is a sectional side elevation view of the hopper, the closure structure, and a spring.

FIG. 11 is a front isometric view of an upper portion of the closure structure.

FIG. 12 is a rear isometric view of the upper portion of the closure structure.

FIG. 13 is a top isometric view of a wire connector used on the spreader illustrated in FIGS. 1-4.

FIG. 14 is a bottom isometric view of the wire connector.

FIG. 24 is an enlarged isometric view of a handle, a lever and a spring used on the spreader illustrated in FIGS. 1-4.

FIG. 25 is a side elevation view of the spreader in a folded or collapsed position.

FIG. 26 is an enlarged, partial sectional elevation view of wheels and an axle used on the spreader illustrated in FIGS. 1-4.

DETAILED DESCRIPTION OF PREFERRED EMBODIMENTS OF THE INVENTION

Figures 4, 5:
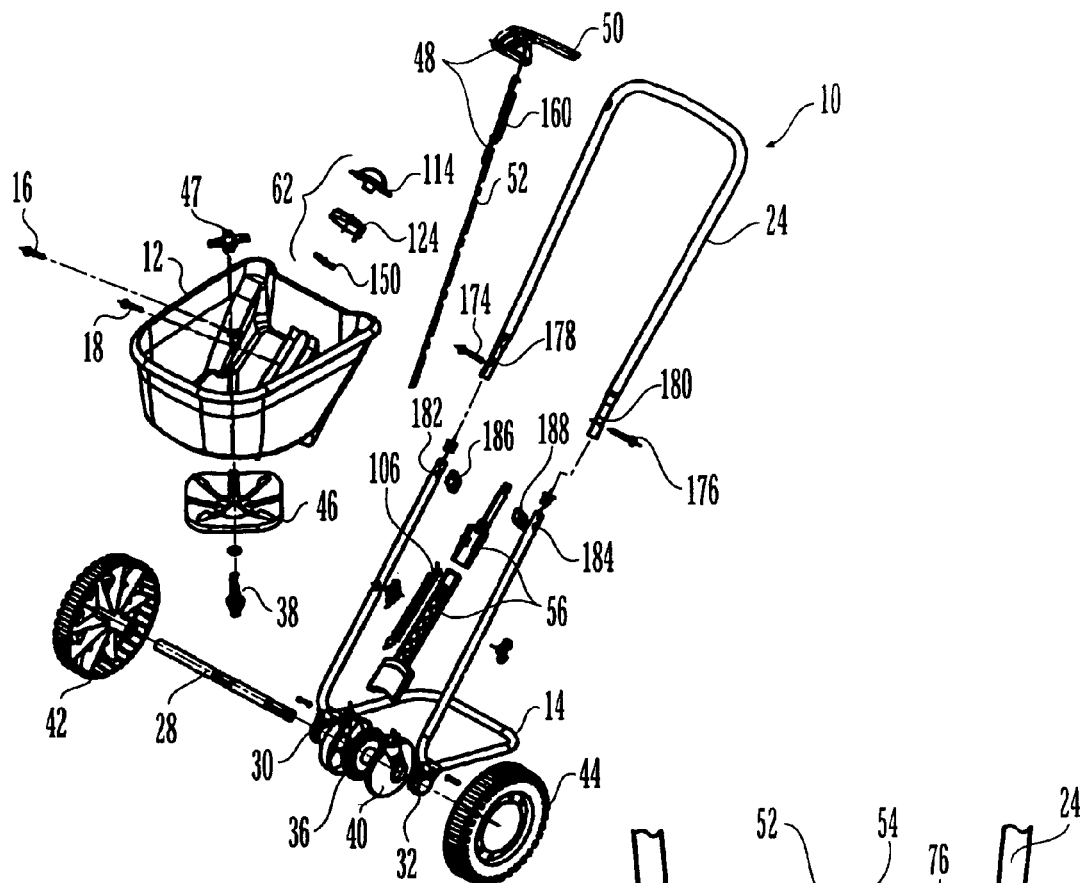
FIG. 4 is a front downward looking exploded isometric view of the spreader illustrated in FIGS. 1-3.
FIG. 5 is a top plan view of a hopper used as part of the spreader shown in FIGS. 1-4.

While the present invention is open to various modifications and alternative constructions, the preferred embodiments illustrating the best mode contemplated by the inventors of carrying out their invention is shown in the various figures of the drawing and will be described herein in detail, pursuant to Title 35 U.S.C. section 112 (first paragraph). It is understood, however, that there is no intention to limit the invention to the particular embodiments, forms or examples which are disclosed herein. To the contrary, the intention is to cover all modifications, equivalent structures and methods, and alternative constructions falling within the spirit and scope of the invention as expressed in the appended Claims section attached hereto, pursuant to Title 35 U.S.C. section 112 (second paragraph).

The robust simplicity of the inventive spreader is seen from a review of FIGS. 1-4 where a collapsible spreader 10 is illustrated. The spreader may be of a broadcast or rotary, or drop type or any other type now made or made in the future. The spreader includes a hopper 12 mounted to a lower, bent, tubular frame 14. Two fasteners 16, 18 extend through two holes in the hopper and two holes in the lower frame and are captured by two wing nuts 20, 22. The lower frame is connected to a pivotal or collapsible, tubular, U-shaped handle 24 which is to be gripped by a spreader operator. The handle pivots or rotates about an axis 26 between an upright position shown in FIG. 1 and a folded position shown in FIG. 25. The axis 26 is located above the hopper. The lower frame 14 is mounted to an axle 28 using two brackets 30, 32. The hopper 12 is structured to carry a spreadable product for dispensing in a controlled manner.

Also mounted to the axle is a gear assembly 34 including a ring gear 36, a pinion gear 38 and a segmented gear housing 40. Novel one piece wheels 42, 44 are mounted at the opposite ends of the axle 28. Mounted above the gear assembly and rotated thereby is an impeller 46 and an agitator 47.

Mounted to the handle 24 is an actuator structure 48 including an operating lever 50 and a control wire 52. The lever is attached to the upper portion of the handle and is to be manipulated by the spreader operator. The control wire 52 is connected to the lever through a coil spring and the wire extends downwardly to connect through a connector 54 to a closure structure 56. The closure structure 56 includes a lower, first or closure portion 58 and an upper, second or arm portion 60. The closure structure is mounted on the hopper 12 below the pivot axis 26.

As will be explained below, the spreader described herein includes a simple and effective selection structure 62 for controlling the extent of movement of the closure structure 56, thereby enabling a pre-selected and controlled spread rate to be achieved for each specific dispensing product.

The hopper 12, FIGS. 5 and 6, includes two side walls 64, 66, a front wall 68, a slanted rear wall 70 and a bottom wall 72. Formed in the rear wall is an opening 74 of about 4.8 square inches. The width of the opening is about 2.4 inches and the length of the opening is about 2 inches. Other opening sizes may be used if desired. The hopper 12 also includes a control panel 76 and a bracket 78, FIG. 3, both molded integrally with the hopper. The control panel includes a hole 80, FIG. 18. In FIG. 5, the hopper is shown without the closure structure 56 so that the opening 74 is fully open or unblocked. In FIG. 6, the closure structure 56 is mounted on the hopper, and the opening 74 is partially blocked by the closure portion 58 of the closure structure 56.

The closure structure 56, illustrated in detail in FIGS. 7-12, includes the closure portion 58 and the elongate arm portion 60. The closure portion 58 is positioned to block the hopper opening 74. The arm portion 60 is adjustable relative to the closure portion 58 to vary the length of the closure structure 56 in a direction generally parallel to the slanted rear wall 70 of the hopper 12, as best shown in FIG. 10. Once the length of the closure structure is determined during assembly at a manufacturing facility, the arm portion 60 and closure portion 58 are fixed together as shown in FIG. 3.

The closure portion 58 of the closure structure 56 includes a panel section 82 and a leg section 84 formed integrally. The panel section 82 blocks, fully or partially, the hopper opening 74. The leg section 84 adjustably engages the arm portion 60.

The arm portion 60, FIGS. 11 and 12, includes a lower section 86 with a side or abutment tab 88 and an upper section 90 with laterally extending arms 92, 94. The lower section 86 of the arm portion 60 has a semi-cylindrical shape to engage and adjustably overlap with the leg section 84 of the closure portion 58. The overlapping lower section 86 of the arm portion 60 and the leg section 84 of the closure portion 58 are fixed together by welding or by using a bolt and nut combination or any other suitable means or mechanism. When the two structures are fixed and secured, they define the length of the closure structure 56. By adjusting and then fixing the length of the closure structure, any deviations in dimensions or the build-up of tolerances arising during manufacturing and assembly of parts are accommodated. In earlier spreaders, every time the handle was pivoted to a collapsed position (as shown in FIG. 25), tolerance variations of holes in the handle and in the frame often caused a variation in the dimension between an operating handle at or near the top of the spreader and the connection to a shut-off plate used to unblock the hopper opening. In such earlier spreaders, a micrometer and a calibration element were used to reset the operating mechanism that moved the shut-off plate blocking the opening in the hopper so that spread rates were consistently maintained. The above described adjustment and fixation of the length of the closure structure 56, which is mounted directly on the hopper, makes irrelevant inadvertent variations in the distance between the operating lever 50 and the closure structure 56. This results in the elimination of the micrometer and of the calibration element.

The closure structure 56 is mounted directly on the hopper 12 by having the bracket 78 of the hopper support in a slideable fashion the closure portion 58, and by having the hopper control panel 76 support in a slideable fashion the arm portion 60 when the arm portion extends through the hole 80.

The laterally extending arms 92, 94 engage the finger-shaped wire connector 54, FIGS. 13 and 14, that entraps a lower end 98, FIG. 3, of the control wire 52 in a curved slot 100. The finger-shaped connector 54 includes a pair of lower slots 102, 104 for receiving and capturing the lateral arms 92, 94 by engaging the two elements, and when twisted, entrapping the arms. The curved slot allows the control wire 52 to move and accommodate the pivotal handle 24 when the handle is collapsed into a lowered position for storage and/or shipping as shown in FIG. 25.

A first biasing structure 106, FIGS. 4 and 10, in the form of a lower coil spring is connected at an upper end 108 to the closure structure 56 and at a lower end 110 to a post 112 molded into the rear wall 70 of the hopper 12. The spring 106 ensures that the closure structure 56 is biased to a closed or blocking position of the hopper opening 74.

In assembly, the closure structure 56 is connected through the wire connector 54 to the control wire 52 so that movement of the operating lever 50 lifts the closure structure 56 against the biasing force of the spring 106, to at least, partially unblock the hopper opening 74. The extent of the unblocking movement of the closure structure 56 is determined by setting the selection structure to a predetermined position to enable a controlled amount of the product in the hopper to be dispensed.

Figure 15:
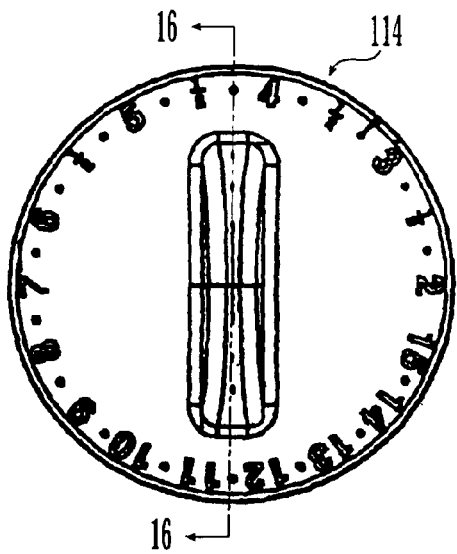
FIG. 15 is a front elevation view of a rate setting knob portion of a selection structure used on the spreader illustrated in FIGS. 1-4.
Figure 16:
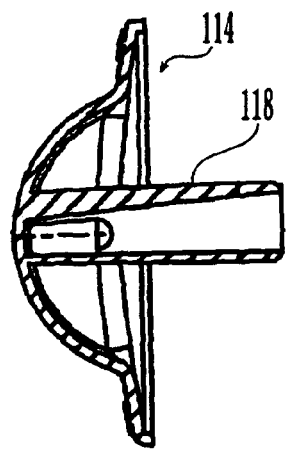
FIG. 16 is a sectional view taken along line 16-16 of FIG. 15.
Figure 17:
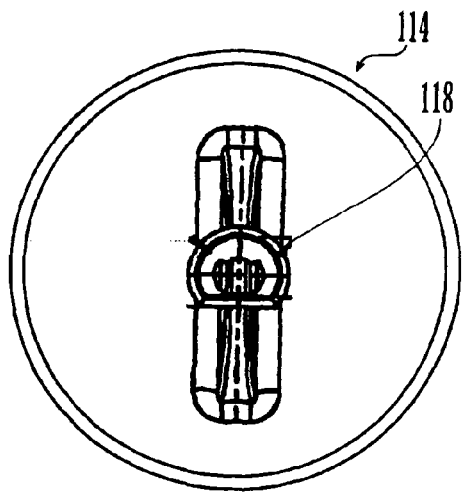
FIG. 17 is a rear elevation view of the rate setting knob portion.

The selection structure 62 is mounted on the hopper control panel 76 and includes a rate control knob 114, FIGS. 15-17, which bears a series of numbers from two to fifteen, as well as half and quarter indicia between selected numbers. A number on the knob is designed to match a number placed on the product packaging of the products to be dispensed by the spreader. The number on the product packaging indicates the rate of spread and is coordinated with the numbers on the knob. The knob is supported on an upper surface 116, FIG. 3, of the control panel 76. The knob includes a stem 118, FIGS. 16 and 17, that is partially cylindrical and partially planar, and the stem extends through a hole 120, FIG. 18, in the control panel 76. Mounted to the stem 118 on the opposite or lower surface 122 of the control panel is an adjustment cup 124, FIG. 4, 19 and 20 that is also part of the selection structure 62.

The adjustment cup 124, FIGS. 19-23, includes a base portion 126 with an opening 128 that is partially circular and partially linear for receiving the stem 118 of the knob 114 in an engaged relationship. The engaged relationship ensures that the knob and the adjustment cup are rotationally aligned at all times and that rotational movement of the knob is transmitted to and rotates the adjustment cup in a synchronized fashion. The adjustment cup 124 also includes a cylindrical wall portion 130 extending away from the base portion 126. The wall portion 130 has a slanted edge 132 positioned opposite the base portion 126. The slanted edge 132 is circular and includes thirty-six steps from a lowest step 134 to a highest step 136. Each step corresponds to one of the numbers and indicia on the knob 114. Adjacent to the highest step 136 is an elongated setting tab 138 that extends beyond the highest step 136. The setting tab 138 is configured to make contact with the side or abutment tab 88 of the arm portion 60 of the closure structure 56.

Figure 18:
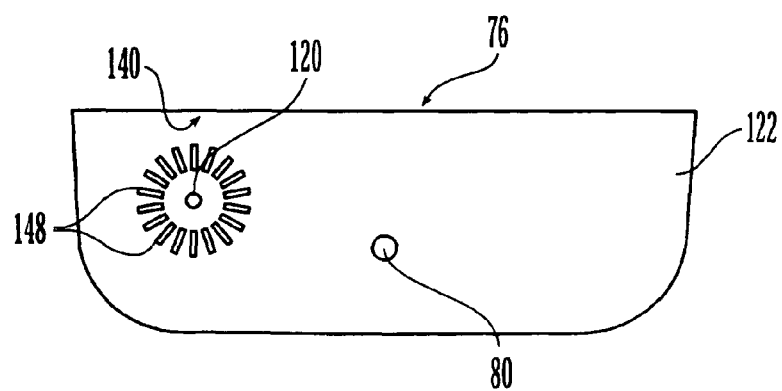
FIG. 18 is a rear view of a control panel portion of the hopper.

To ensure that the knob settings match the rate setting numbers on product packaging, the spreader is adjusted at the factory by rotating the knob so that an unmarked space between the numbers "two" and "fifteen" on the knob 114 is aligned with a pointer 140, FIGS. 3 and 18, on the control panel. This positions the elongated setting tab 138 so as to make contact with the side tab 88 of the arm portion 60 of the closure structure 56. Because the length of the closure structure 56 may be adjustably extended or retracted such that when the closure structure is biased to a closed or blocking position relative to the hopper opening 74, the setting tab 138 of the adjustment cup 124 is abutted by the side tab 88 of the closure structure 56. Then the longitudinal length of the combined closure portion 58 and arm portion 60 of the closure structure 56 is fixed either by a fastener or by welding or some other means. Thereafter, rotation of the knob to a specific knob number determines which of the steps of the circular, slanted edge 132 will be positioned to be abutted by upward movements of the side tab 88 when the closure structure 56 is raised by the actuator structure 48. When the operator lifts the operating lever 50 against the bias of the lower spring 106, the control wire 52 will lift the closure structure 56 upwardly in a linear fashion until the side tab 88 comes into contact or abuts a step of the circular, slanted edge 132 of the rate setting adjustment cup 124. The abutment prevents the closure structure from any further upward movement. The abutment also limits the unblocking or uncovering of the hopper opening 74 to a predetermined area thereby ensuring control of the flow rate of product out of the hopper. Thus, the amount of unblocking of the hopper opening is a function of the rotational position of the knob 114 and of the adjustment cup 124.

Once the side tab 88 abuts the elongated setting tab 138 the extent of movement by the closure structure 56 is fixed for each of the setting numbers. Rotating the knob to each number creates a specific limit to the travel distance of the closure structure before the side tab abuts the circular edge of the adjustment cup. The closure structure will open or unblock the hopper opening 74 only to the extent of the distance from an extended tip 142 of the setting tab 138 to the selected step on the circular edge 132. The longest distance is to the lowest step 134 (setting "15") and the shortest distance is to the highest step 136 (setting "2").

Figure 19:
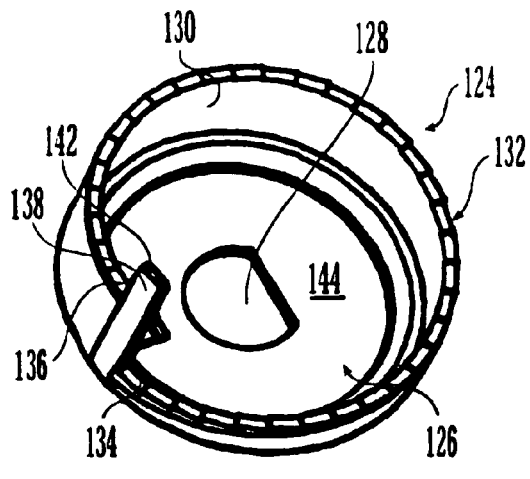
FIG. 19 is a rear isometric view of an adjustment cup portion of the selection structure.
Figure 20:
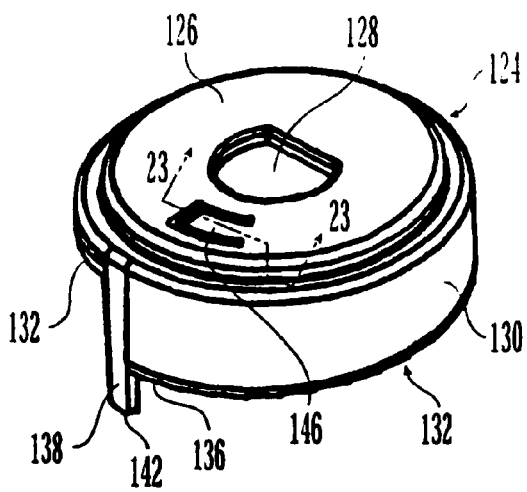
FIG. 20 is a front isometric view of the adjustment cup portion.
Figure 21:
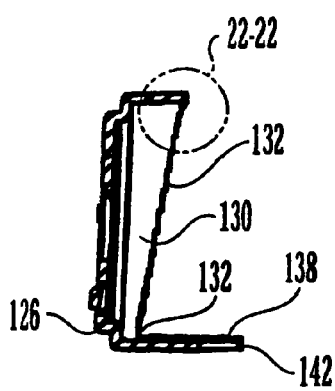
FIG. 21 is a sectional view taken along line 21-21.
Figure 22:
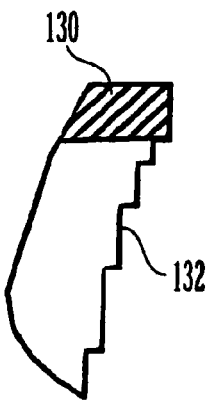
FIG. 22 is an enlarged sectional view taken within the circle 22-22 of FIG. 21.
Figure 23:
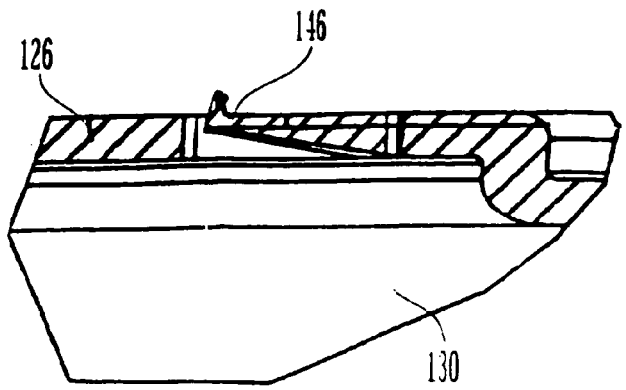
FIG. 23 is an enlarged sectional view taken along the line 23-23 of FIG. 20.

A preferred adjustment cup 124 has a diameter of about 2.483 inches, the setting tab 138 extends about 1.528 inches from a surface 144, FIG. 19, of the base portion 126 that abuts the lower surface 122 of the hopper control panel 76, and each of the next sixteen steps from the highest step 136, through an arc of about 160 degrees, drops about 0.012 inches per step. For the next nineteen steps, over an arc of about 170 degrees, the drop is about 0.024 inches per step.

The adjustment cup 124 also includes a flexible arm 146 formed in the base portion 126 that engages small recesses 148, FIG. 18, in the control panel 76 for providing a tactile and audible indication of the changing location of the knob when the knob is rotated. A retainer disc 150, FIG. 4, is attached to the stem 118 of the knob 114 and sandwiches the adjustment cup 124 and the control panel 76 between itself and the knob 114.

In operation, the spreader operator pushes on the handle 24 while holding the operating lever 50 in an upward or operational position. As the spreader 10 rolls over ground to be treated, such as with fertilizer, nutrient, weed controller, or the like, the wheels 42, 44 rotate and the rotating wheels cause the gears in the gear assembly 34 to rotate causing the impeller 46 to spin. Holding the operating lever upwardly unblocks the hopper opening 74 by pulling upwardly on the closure structure 56 allowing spreadable product in the hopper to be dispensed onto the spinning impeller 46 which broadcasts or disperses the product in a predetermined pattern on the ground. When the operator releases his/her grip on the operating lever 50, the spring 106 forces the closure structure 56 to move into a closed or blocking position thereby closing the hopper opening 74 and stopping the product carried by the hopper from being dispensed.

The various product to be dispensed by the spreader may have different spread rate designations. For example, SCOTTS brand WINTERIZER With PLUS 2 Weed Control has a spread rate designation of 3¾ using a SCOTTS brand Speedy Green Rotary Spreader; and SCOTTS brand STARTER FERTILIZER has a spread rate designation of 5½ using a SCOTTS brand Drop Spreader to achieve a medium concentration and a rate designation of 6½ to achieve a medium to heavy concentration.

Another feature of the spreader is the inclusion of a second or upper biasing structure 160 which may be in the form of a second coil spring, FIGS. 4 and 24. The upper spring attaches at a lower end portion 162 to the upper end portion of the control wire 52 and at an upper end portion 164 to the lever 50. The spring rate of the upper spring 160 is greater than the spring rate of the lower spring 106. Hence, when an operator lifts the operating lever 50 initially, the force required is that to overcome only the spring rate of the lower spring 106. The lower spring has a spring constant of about one pound per inch and is stretched about four inches initially. Hence, there is about four pounds of closing force acting on the closure structure 56. The force needed to stretch the lower spring to five inches is about five pounds. When the side tab 88 abuts an aligned step on the circular edge 132, movement of the closure structure is physically stopped regardless of the force applied on the operating lever 50. If an operator desires to bring the operating lever 50 adjacent to the handle 24 (as shown in FIG. 1), or if the operator accidentally applies more force than then is necessary after the closure structure has been lifted to its limit, the operator must pull against the biasing force of the upper spring 160 in addition to the biasing force of the lower spring 106. The upper spring has a spring rate of about nine pounds per inch. Hence, an operator must overcome a force of about six pounds, minimum, to bring the lever to a position generally parallel to the handle, a more comfortable arrangement for most operators. At a maximum setting, requiring the longest pull, an operator must exert about eleven and a half pounds of force. The added force of pulling on the upper spring alerts the operator that the hopper is fully opened, as a function of the knob setting. The upper spring also protects the lever and other elements from being overstressed and broken.

The handle 24 is connected to the lower frame 14 by a pair of oppositely disposed fastener assemblies 170, 172, FIGS. 1-4. Each fastener assembly includes a bolt 174, 176 extending through a hole 178, 180 in the handle, and an aligned hole 182, 184 in the lower frame. A thumbnut 186, 188 is connected to the bolt. In operation, the handle is aligned with the lower frame as shown in FIGS. 1-3 and the thumbnuts are tightened so as to fix the handle in an upright operating position. When shipped and for storage, if desired, the thumbnuts may be loosened and the handle rotated to a folded or collapsed position as shown in FIG. 25. The folded or shipping position allows the spreader to be packaged efficiently in a shipping container as disclosed in U.S. Pat. No. 5,489,023 whose disclosure is incorporated herein in full by reference.

The wheels 42, 44 of the spreader may be molded in one piece, and each wheel includes an outer threaded portion 190, 192, FIGS. 2 and 26, a series of radially extending spokes, such as the spokes 194, 196, a central cap portion 198, 200, and a central, longitudinally segmented, hub portion 202, 204. (See also FIG. 3.) The axle 28 is formed with first and second groups of end portion serrations 206, 208. Each wheel may be made of two molded pieces, the hub, cap and spoke portions molded as one piece and the threaded portion molded as a second piece. This allow two different materials to be used. The axle includes a third group of middle serrations 210 and a fourth group of serrations 212 near one of the end portions, such as the second group of end portion serrations 208. The first and second groups of end portion serrations 206, 208 and the fourth group of serrations 212 cut into respective inner surfaces 214, 216 of the wheel hub portions 202, 204 when the wheels are pressed unto the axle 28. Outer cylindrical surfaces 218, 220 of the hub portions act as bearings for the brackets 30, 32, FIG. 4. The segmented hub portions may include small bumps 219, 221 to enable the wheels to also snap-fit with the brackets. The third group of middle serrations 210 receives the ring gear 36 in a press fitted arrangement.

The one piece wheel and the serrated axle reduce the number of wheel parts when compared to earlier spreaders, and results in fewer parts, a more economical structure and faster assembly.

Figure 27:
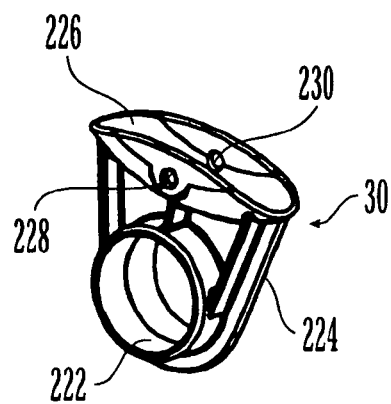
FIG. 27 is an isometric view of a mounting bracket used on the spreader illustrated in FIGS. 1-4.

Referring to FIG. 27, the bracket 30 is shown in more detail. The brackets include lower circular opening 222, a triangular body 224, an upper frame cradle 226 and fastener receiving holes 228, 230. The opening 222 receives the segmented hub in a snap fitting arrangement. The holes 228, 230 receive a fastener that also traverses the tubular frame 14 to secure the frame and the bracket together.

Figure 28:
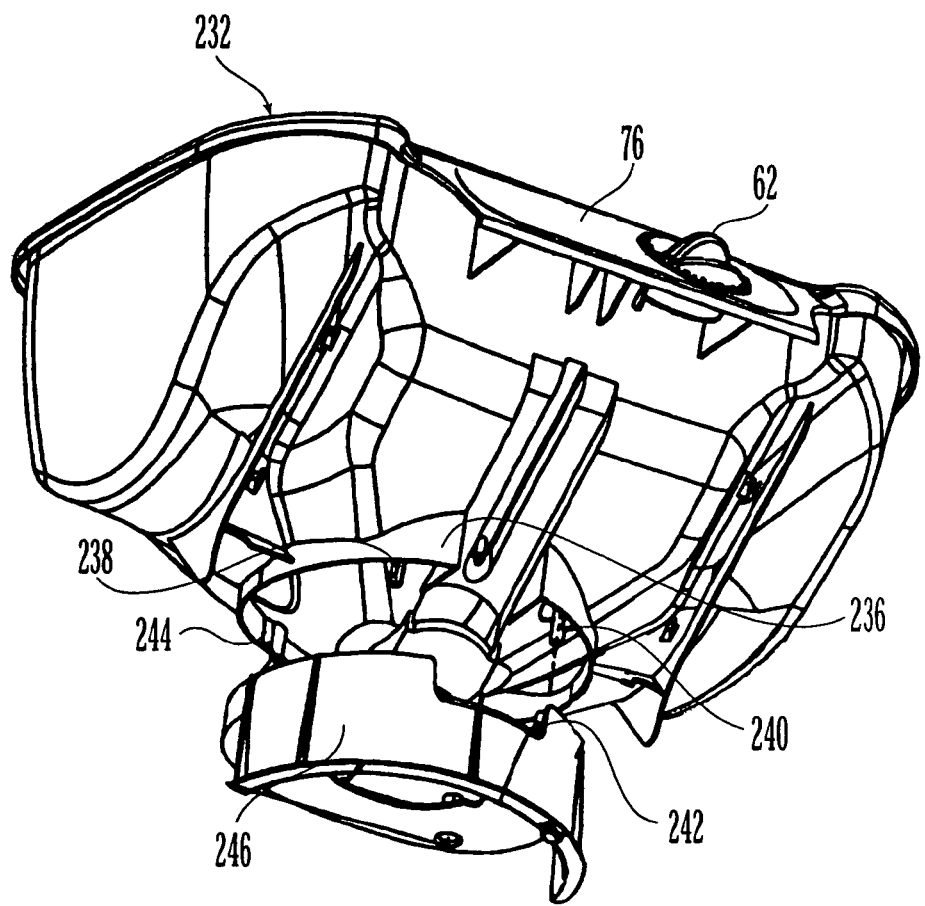
FIG. 28 is an upward looking isometric view of another hopper embodiment and a deflector track.

Referring to FIG. 28, there is illustrated another embodiment of a hopper 232. The hopper 232 includes a mounting flange 236 and fastener receiving posts, 238, 240, 242, 244. Attached to the mounting flange is a deflector track 246. The deflector track is part of a system for controlling and directing the spread of product as fully described in U.S. Pat. No. 6,616,074 whose disclosure is incorporated herein in full by reference.

It is to be noted that the adjustment and fixing feature of the closure structure, the rate setting feature of the selection structure, the one piece wheel and serrated axle feature, and the feature of a protective upper spring are independent of one another and all of the features may not be used in relation to one spreader. For example, a prior art wheel arrangement may be used with the adjustment and fixing feature of the closure structure, or the adjustment and fixing closure structure may be used without the upper spring feature. Or, the one piece wheel may be used on a prior art spreader.

The above specification describes in detail a preferred embodiment of the present invention. Other examples, embodiments, modifications and variations will, under both the literal claim language and the doctrine of equivalents, come within the scope of the invention defined by the appended claims. For example, a different shape for the knob or of the adjustment cup may be used, or a different shape for the side tab or closure structure may also be used. Different forms of wheels and axles, hoppers and hopper openings and frames may also be used. They are all considered equivalent structures and will also come within the literal language of the claims. Still other alternatives will also be equivalent as will many new technologies. There is no desire or intention here to limit in any way the application of the doctrine of equivalents nor to limit or restrict the scope of the invention.

The invention claimed is:

1. A collapsible spreader comprising:
   a hopper having an opening through which spreadable product carried by the hopper is dispensed;
   an actuator structure comprising a lever and a wire with a biasing structure operatively connected between the lever and the wire; and
   a closure structure connected to the actuator structure, the closure structure being mounted on the hopper and being adjustable to enable the closure structure to selectively block and unblock the hopper opening; wherein:
   the closure structure comprises an arm portion and a closure portion,
   the arm portion and the closure portion being adjustable relative to each other and being fixable to define a length of the closure structure.

2. The collapsible spreader of claim 1 wherein: the closure structure includes an abutment tab.

3. The collapsible spreader of claim 1 including: a moveable selector structure mounted on the hopper and being engageable with the closure structure.

4. The collapsible spreader of claim 3 wherein: the moveable selector structure is rotatable.

5. The collapsible spreader of claim 4 wherein: the rotatable selector structure includes a cup shaped portion.

6. The collapsible spreader of claim 5 wherein: the cup shaped portion includes a slanted edge.

7. The collapsible spreader of claim 6 wherein: the slanted edge of the cup shaped portion is stepped from a lowest step to a highest step.

8. The collapsible spreader of claim 3 wherein:
   the closure structure includes an abutment tab; and
   the selector structure includes an elongated setting tab positioned to operatively engage the abutment tab of the closure structure.

9. The collapsible spreader of claim 1 including: a biasing structure for biasing the closure structure into position to block the hopper opening.

10. The collapsible spreader of claim 9 including:
    an axle;
    a pair of wheels mounted to the axle;
    a frame mounted to the axle;
    a handle connected to the frame;
    the hopper being mounted to the frame; and
    the actuator structure being mounted to the handle.

11. The collapsible spreader of claim 1 including:
    a pair of wheels for supporting the hopper,
    each of the pair of wheels having an outer thread portion, a centrally located hub portion formed integral with the outer thread portion and a plurality of radially extending spokes formed integral with the hub portion,
    the spokes extending between the hub portion and the outer thread portion,
    a serrated axle, having a first end and a second end, comprising a plurality of serrations located on the first end and the second end,
    the hub portion having an interior surface for receiving the serrated axle; and the serrations scoring the interior surface to mount the wheel to the serrated axle when the serrated axle is received in the hub portion.

12. A collapsible spreader comprising:
    a hopper adapted to be moveable, the hopper having an opening through which spreadable product carried by the hopper is dispensed;
    an adjustable and movable closure structure mounted on the hopper for blocking and selectively unblocking the hopper opening, the closure structure including an elongated arm portion and a closure portion;
    the arm portion and the closure portion being adjustable relative to each other and being fixable to define a length of the closure structure;
    an actuator structure connected to the arm portion of the closure structure for selectively moving the closure portion of the closure structure, the actuator structure comprising a lever and a wire with a biasing structure operatively connected between the lever and the wire; and
    a selector structure operatively engageable with the arm portion of the closure structure to establish the extent of movement of the closure portion of the closure structure.

13. The collapsible spreader of claim 12 wherein:
    the closure structure includes an abutment tab; and
    the selector structure includes a setting tab for engaging the abutment tab to define a length of the closure structure.

14. The collapsible spreader of claim 13 wherein: the selector structure is rotatable and includes a cup shaped portion.

15. The collapsible spreader of claim 14 wherein: the rotatable cup shaped portion includes a slanted edge.

16. The collapsible spreader of claim 15 wherein: the slanted edge of the cup shaped portion is stepped from a lowest step to a highest step.

17. The collapsible spreader of claim 16 wherein: the abutment tab of the closure structure is selectively engageable with the stepped slanted edge.

18. The collapsible spreader of claim 12 including: a biasing structure connected to the closure structure for biasing the closure structure into a position to block the hopper opening.

19. The collapsible spreader of claim 12 including: a second biasing structure operatively connected to the actuator structure.

20. The collapsible spreader of claim 12 wherein: the selector structure includes a cup-shaped portion having a varying height edge.

21. A collapsible spreader comprising:
    a hopper adapted to be moveable, the hopper having an opening through which spreadable product carried by the hopper is dispensed;
    an adjustable and moveable closure structure mounted on the hopper for blocking and selectively unblocking the hopper opening, the closure structure comprising an elongated arm portion and a closure portion;

an actuator structure connected to the arm portion of the closure structure for selectively moving the closure portion of the closure structure;

a selector structure operatively engageable with the arm portion of the closure structure to establish the extent of movement of the closure portion of the closure structure; wherein:

the arm portion and the closure portion of the closure structure are adjustably connected and fixable to define the length of the closure structure;

the selector structure comprises a cup-shaped portion having a varying height edge;

the actuator structure comprises a lever and a wire; and including a first biasing structure connected to the hopper and the closure structure; and a second biasing structure operatively connected between the lever and the wire.

22. A collapsible spreader comprising:

a hopper having an opening through which spreadable product carried by the hopper is dispensed;

a handle connected to the hopper and mounted for pivotal movement about an axis located above the hopper, the handle being pivotal between an upright position and a folded position;

an actuator structure connected to the handle;

a closure structure connected to the actuator structure and to the hopper for enabling selective blocking and unblocking of the hopper opening upon operation of the actuator structure, the closure structure being positioned below the pivot axis of the handle whereby operation of the closure structure is not affected by a pivotal movement of the handle between the upright and folded positions;

a selector operatively engaged with the closure structure to control an amount of the hopper opening that can be unblocked by the operation of the actuator structure;

the selector comprising a plurality of markings;

a length of the closure structure being adjustable in assembly of the spreader to compensate for deviations in dimensions arising during manufacturing and assembly of components of the spreader, and to establish that each of the markings corresponds, respectively, with a predetermined amount of the hopper opening that can be unblocked by the operation of the actuator structure.

23. The collapsible spreader of claim 22 including: a frame for supporting the hopper and for being connected to the handle wherein the handle is pivotal relative to the frame.

24. The collapsible spreader of claim 23 wherein: the actuator structure includes a lever mounted to the handle and a wire operatively connected to the lever and extending downwardly to the closure structure.

25. A collapsible spreader comprising:

a hopper having an opening through which spreadable product carried by the hopper is dispensed;

an actuator structure wherein the actuator structure comprises a lever and a wire wherein the actuator structure comprises a biasing structure operatively connected between the lever and the wire; and a closure structure connected to the actuator structure, the closure structure being mounted on the hopper and being adjustable to enable the closure structure to selectively block and unblock the hopper opening; wherein:

the closure structure comprises an arm portion and a closure portion, the arm portion and the closure portion being adjustable relative to each other and being fixable to define a length of the closure structure.

* * * * *